United States Patent
Lai et al.

(10) Patent No.: US 10,547,879 B2
(45) Date of Patent: Jan. 28, 2020

(54) METHOD AND APPARATUS FOR STREAMING VIDEO CONTENT

(71) Applicant: MEDIATEK INC., Hsinchu (TW)

(72) Inventors: Wang Lin Lai, Belmont, CA (US); Shan Liu, San Jose, CA (US)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 15/646,837

(22) Filed: Jul. 11, 2017

(65) Prior Publication Data

US 2018/0020248 A1 Jan. 18, 2018

Related U.S. Application Data

(60) Provisional application No. 62/362,078, filed on Jul. 14, 2016, provisional application No. 62/364,364, filed on Jul. 20, 2016.

(51) Int. Cl.
*H04N 7/173* (2011.01)
*H04N 21/2343* (2011.01)
(Continued)

(52) U.S. Cl.
CPC . *H04N 21/23439* (2013.01); *H04N 21/21805* (2013.01); *H04N 21/2353* (2013.01);
(Continued)

(58) Field of Classification Search
CPC ....... H04N 21/23439; H04N 21/21805; H04N 21/2353; H04N 21/435; H04N 21/437;
(Continued)

(56) References Cited

U.S. PATENT DOCUMENTS

| 2009/0183085 A1* | 7/2009 | Pasetto | G06F 3/1431 715/744 |
| 2012/0020413 A1* | 1/2012 | Chen | H04N 19/597 375/240.26 |

(Continued)

FOREIGN PATENT DOCUMENTS

| CN | 104219559 A | 12/2014 |
| CN | 104574400 A | 4/2015 |

OTHER PUBLICATIONS

International Search Report and Written Opinion of the International Searching Authority dated Sep. 5, 2017 in PCT/CN2017/092907 filed Jul. 14, 2017.

*Primary Examiner* — Nnenna N Ekpo
(74) *Attorney, Agent, or Firm* — Oblon, McClelland, Maier & Neustadt, L.L.P.

(57) ABSTRACT

Aspects of the disclosure provide an apparatus that includes an interface circuit, a processing circuit and a display device. The interface circuit is configured to receive media description information of media data. The media data includes a plurality of segment streams having different coverage in spatial domain for video content, the media description information is indicative of the different coverage in spatial domain of the plurality of segment streams. The processing circuit is configured to determine one or more segment streams based on a region of interests for image generation and the different coverage in spatial domain of the plurality of segment streams, select segments in the one or more segment streams, and cause the interface circuit to request and receive the selected segments. The display device is configured to display images generated based on the selected segments.

12 Claims, 10 Drawing Sheets

(51) Int. Cl.
*H04N 21/218* (2011.01)
*H04N 21/235* (2011.01)
*H04N 21/435* (2011.01)
*H04N 21/437* (2011.01)
*H04N 21/4402* (2011.01)
*H04N 21/4728* (2011.01)
*H04N 21/81* (2011.01)

(52) U.S. Cl.
CPC ......... *H04N 21/435* (2013.01); *H04N 21/437* (2013.01); *H04N 21/440245* (2013.01); *H04N 21/4728* (2013.01); *H04N 21/816* (2013.01)

(58) Field of Classification Search
CPC ....... H04N 21/440245; H04N 21/4728; H04N 21/816
USPC .................................. 725/100, 131, 151
See application file for complete search history.

(56) References Cited

U.S. PATENT DOCUMENTS

| | | |
|---|---|---|
| 2012/0147954 A1 | 6/2012 | Kasai et al. |
| 2013/0031589 A1* | 1/2013 | Casanova ........ H04N 21/23431 725/93 |
| 2014/0359656 A1 | 12/2014 | Banica et al. |
| 2015/0143239 A1 | 5/2015 | Birkbeck et al. |
| 2015/0341552 A1* | 11/2015 | Chen .................. H04N 5/23238 348/38 |

\* cited by examiner

… (1)

METHOD AND APPARATUS FOR STREAMING VIDEO CONTENT

INCORPORATION BY REFERENCE

This present disclosure claims the benefit of U.S. Provisional Application No. 62/362,078, "Methods and Apparatus of Streaming VR and 360 video Content" filed on Jul. 14, 2016, and U.S. Provisional Application No. 62/364,364, "Methods and Apparatus of Streaming VR and 360 video Content" filed on Jul. 20, 2016, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Three-dimensional environments can be rendered to provide special user experience. For example, in a virtual reality application, computer technologies create realistic images, sounds and other sensations that replicate a real environment or create an imaginary setting, thus a user can have a simulated experience of a physical presence in a three-dimensional environment.

SUMMARY

Aspects of the disclosure provide an apparatus that includes an interface circuit, a processing circuit and a display device. The interface circuit is configured to receive media description information of media data. The media data includes a plurality of segment streams having different coverage in spatial domain for video content, the media description information is indicative of the different coverage in spatial domain of the plurality of segment streams. The processing circuit is configured to determine one or more segment streams based on a region of interests for image generation and the different coverage in spatial domain of the plurality of segment streams, select segments in the one or more segment streams, and cause the interface circuit to request and receive the selected segments. The display device is configured to display images generated based on the selected segments.

In an embodiment, the plurality of segment streams respectively correspond to sub-picture regions of a projected plane from a sphere surface. In an example, the media description information includes sections for sub-picture regions, and includes geometry information respectively in the sections for the sub-picture regions, and the processing circuit is configured to determine the one or more segment streams based on the geometry information in the sections for the sub-picture regions. Further, a section includes a plurality of representations corresponding to segment streams of the geometry information and different bitrates, and the processing circuit is configured to determine a representation of a bitrate that satisfies a bitrate requirement.

According to an aspect of the disclosure, the media description information is configured to indicate at least a first segment stream and a second segment stream that cover at least a portion of the region of interests with different resolutions, and the processing circuit is configured to switch from one of the first segment stream and the second segment stream to another based on a quality requirement.

According to another aspect of the disclosure, the media description information is configured to indicate that the plurality of segment streams correspond to projected faces of a platonic solid from a sphere surface, and the processing circuit is configured to determine the one or more segment streams corresponding to respective projected faces.

In an embodiment, the plurality of segment streams correspond to a two-dimensional plane with different regions in the two-dimensional plane having a specific resolution, and the processing circuit is configured to determine one segment stream with the region of interests having the specific resolution.

In an example, the media description information includes a projection indication that is indicative of a projection method from a sphere surface to a plane.

In another example, the media description information includes geometry information in a sphere coordinate system to indicate the different coverage in spatial domain.

In an embodiment, the processing circuit is configured to detect a change in the region of interests, and determine an update of the one or more segment streams in response to the change.

Aspects of the disclosure provide a method for image rendering. The method includes receiving media description information of media data. The media data includes a plurality of segment streams having different coverage in spatial domain for video content, and the media description information is indicative of the different coverage in spatial domain of the plurality of segment streams. Further, the method includes determining one or more segment streams based on a region of interests for image generation and the different coverage in spatial domain of the plurality of segment streams, selecting segments in the one or more segment streams, transmitting a request for the selected segments, receiving the selected segments and displaying images generated based on the selected segments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
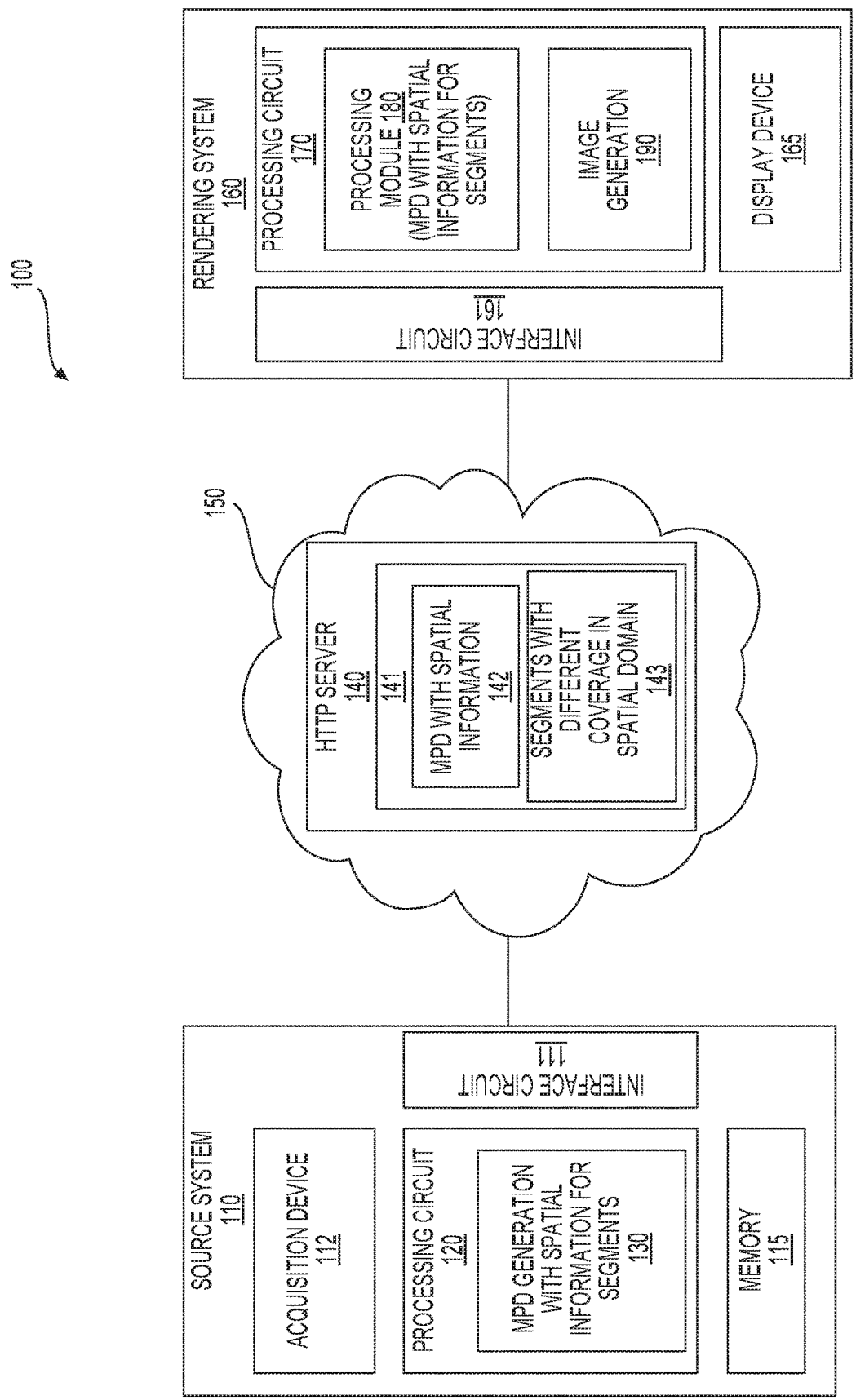
FIG. 1 shows a block diagram of a media system 100 according to an embodiment of the disclosure.

FIG. 1 shows a block diagram of a media system 100 according to an embodiment of the disclosure. The media system 100 includes a source system 110, a delivery system 150 and a rendering system 160 coupled together. The source system 110 is configured to acquire media data for three-dimensional environments and suitably encapsulate the media data. The delivery system 150 is configured to deliver the encapsulated media data from the source system 110 to the rendering system 160. The rendering system 160 is configured to render simulated three-dimensional environments according to the media data.

According to an aspect of the disclosure, the source system 110 is configured to generate segment streams with different coverage in spatial domain (e.g., region coverage, quality coverage) for video content in the media data, and include spatial information for the segment streams in a description file, such as a media presentation description (MPD) file. The delivery system 150 is configured to store the description file, the segment streams for the video content, and other suitable media data. Further, the rendering system 160 can download the description file, and determine one or more segment streams based on spatial requirement (e.g., a region of interests for image generation) and the spatial information of the segment streams. Further, the rendering system 160 can select segments from the one or more segment streams, and request the selected segments from the delivery system 150. When the rendering system 160 receives the selected segments, the rendering system 160 can generate images of the region of interest based on the selected segments.

The source system 110 can be implemented using any suitable technology. In an example, components of the source system 110 are assembled in a device package. In another example, the source system 110 is a distributed system, components of the source system 110 can be arranged at different locations, and are suitable coupled together for example by wire connections and/or wireless connections.

In the FIG. 1 example, the source system 110 includes an acquisition device 112, a processing circuit 120 (e.g., including an image processing circuit, an audio processing circuit and the like), a memory 115, and an interface circuit 111 coupled together.

The acquisition device 112 is configured to acquire various media data, such as images, videos, sound, and the like of three-dimensional environments. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images and/or videos of various directions in a surrounding space.

In an embodiment, the images and/or videos taken by the cameras are overlapping, and can be stitched to provide a larger coverage of the surrounding space than a single camera. In an example, the images and/or videos taken by the cameras can provide 360° sphere coverage of the whole surrounding space. It is noted that the images and/or videos taken by the cameras can provide less than 360° sphere coverage of the surrounding space.

The media data acquired by the acquisition device 112 can be suitably stored or buffered, for example in the memory 115. The processing circuit 120 can access the memory 115, process the media data, and encapsulate the media data in suitable format. The encapsulated media data is then suitably stored or buffered, for example in the memory 115.

In an embodiment, the processing circuit 120 includes an audio processing path configured to process audio data, and includes an image/video processing path configured to process image/video data. The processing circuit 120 then encapsulates the audio, image and video data with metadata according to a suitable format.

In an example, on the image/video processing path, the processing circuit 120 can stitch images taken from different cameras together to form a stitched image, such as an omnidirectional image, and the like. Then, the processing circuit 120 can project the omnidirectional image according to suitable two-dimension (2D) plane to convert the omnidirectional image to 2D images that can be encoded using 2D encoding techniques. Then the processing circuit 120 can suitably encode the image and/or a stream of images.

It is noted that the processing circuit 120 can project the omnidirectional image according to any suitable projection technique. In an example, the processing circuit 120 can project the omnidirectional image using equirectangular projection (ERP). The ERP projection projects a sphere surface, such as omnidirectional image, to a rectangular plane, such as a 2D image, in a similar manner as projecting earth surface to a map. In an example, the sphere surface (e.g., earth surface) uses spherical coordinate system of yaw (e.g., longitude) and pitch (e.g., latitude), and the rectangular plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In another example, the processing circuit 120 can project the omnidirectional image to surfaces of platonic solid, such as tetrahedron, cube, octahedron, icosahedron, and the like. The projected surfaces can be respectively rearranged, such as rotated, relocated to form a 2D image. The 2D images are then encoded.

It is noted that, in an embodiment, the processing circuit 120 can encode images taken from the different cameras, and does not perform the stitch operation and/or the projection operation on the images.

It is also noted that the processing circuit 120 can encapsulate the media data using any suitable format. In an example, the media data is encapsulated in a single track. For example, the ERP projection projects a sphere surface to a rectangular plane, and the single track can include a flow of rectangular images of the rectangular plane.

In another example, the media data is encapsulated in multiple tracks. In an example, the ERP projection projects a sphere surface to a rectangular plane, and the rectangular plane is divided into multiple sub-picture regions. A track can include a flow of images of one or more sub-picture regions. In another example, a track can include a flow of images from one or more cameras. In another example, a track can include a flow of images of one or more projection faces of a platonic solid.

According to an aspect of the disclosure, the processing circuit 120 is configured to generate segment streams from media data based on various media characteristics, such as time period, spatial characteristic, media type, language, encoding scheme, and the like. Further, the processing circuit 120 is configured to generate a catalog, such as a media presentation description (MPD) file, and the like. The catalog includes the media characteristics of segment streams and can assist a rendering system, such as the rendering system 160 to request a sequence of segments.

In the FIG. 1 example, the processing circuit 120 includes an MPD generation module 130 configured to generate the MPD file that includes media characteristics of segment streams, and the media characteristics include the spatial characteristic. The MPD file can be used by a rendering system, such as the rendering system 160, to select segments in order to meet client and environment requirements, such as a region of interests, language, network bandwidth, user preference, and the like.

Specifically, in an embodiment, the processing circuit 120 can generate an adaptation set for video content, and generate alternative representations of the video content. In an example, the video content is for a sphere surface and the sphere surface is projected to generate a two-dimensional plane, the two dimensional plane can be divided into sub-picture (also referred to as sub-pic) regions of same size or different sizes. It is noted that any suitable projection or mapping that projects or maps a sphere surface to a two-dimensional plane can be used, such as ERP projection, platonic solid projection, and the like.

In an example, the adaptation set includes sets of representations for respective sub-picture regions, such as a first set of alternative representations for a first sub-picture region, a second set of alternative representations for a second sub-picture region, and the like. A representation corresponds to a segment stream having a plurality of segments for consecutive time slots. In an example, the alternative representations have different video qualities, such as different resolutions, that are suit for different bandwidths, different bitrates and the like.

In another example, the adaptation set includes sets of representations having different qualities, such as a first set of representations of a first quality, a second set of representations of a second quality, a third set of representations of a third quality, and the like. In an example, the two-dimensional plane is divided into sub-picture regions according to different picture quality, and video content of a sub-picture region is encoded in a segment stream. Thus, in the example, a large number of sub-picture regions can correspond to high quality and a small number of sub-picture regions can correspond to low quality. In an example, the two-dimensional plane is encoded as one region to have the first quality; the two-dimensional plane is divided into 4 sub-picture regions to have the second quality; and the two-dimensional plane is divided into 16 sub-picture regions to have the third quality. In the example, the first quality is the lowest quality, and the third quality is the highest quality.

In another example, the adaptation set includes representations of video content with different quality coverage in spatial domain. For example, the adaptation set includes a first representation and a second representation. The first representation corresponds to a first segment stream for video content of a two-dimensional plane, and the second representation corresponds to a second segment stream for video content of the two-dimensional plane. In an example, the first segment stream has high resolution at a first sub-picture region in the two-dimensional plane, and low resolution at the rest of the two dimensional plane; the second segment stream has high resolution at a second sub-picture region in the two dimensional plane, and low resolution at the rest of the two dimensional plane. The first sub-picture region is not the same as the second sub-picture region, but can have a portion overlapped with the second sub-picture region.

The various forms of adaption set will be discussed with reference to FIGS. 2A-2B, and FIGS. 3-7.

In an embodiment, the processing circuit 120 is implemented using one or more processors, and the one or more processors are configured to execute software instructions to perform media data processing. In another embodiment, the processing circuit 120 is implemented using integrated circuits.

In the FIG. 1 example, the segment streams and the MPD file are provided to the delivery system 150 via the interface circuit 111. The delivery system 150 is configured to suitably provide the media data to client devices, such as the rendering system 160. In the FIG. 1 example, the delivery system 150 includes a hypertext transfer protocol (HTTP) server 140 with a memory 141. The memory 141 stores an MPD file 142 and segments 143. The MPD file 142 includes respective addresses (e.g., URL addresses) for the segments 143. The HTTP server 140 is configured to provide segments to a rendering system, such as the rendering system 160, according to an HTTP protocol. The components of the delivery system 150 are suitably coupled together via wired and/or wireless connections. The delivery system 150 is suitably coupled with the source system 110 and the rendering system 160 via wired and/or wireless connections.

The rendering system 160 can be implemented using any suitable technology. In an example, components of the rendering system 160 are assembled in a device package. In another example, the rendering system 160 is a distributed system, components of the source system 110 can be located at different locations, and are suitable coupled together by wire connections and/or wireless connections.

In the FIG. 1 example, the rendering system 160 includes an interface circuit 161, a processing circuit 170 and a display device 165 coupled together. The interface circuit 161 is configured to transmit messages, such as request messages, and the like to the delivery system 150 to request media data, and is configured to receive messages of media data, such as the MPD file 142, segments, and the like from the delivery system 150.

The processing circuit 170 is configured to process the media data and generate images for the display device 165 to present to one or more users. The display device 165 can be any suitable display, such as a television, a smart phone, a wearable display, a head-mounted device, and the like.

According to an aspect of the disclosure, the processing circuit 170 is configured to cause the interface circuit 161 to request the MPD file and the process the MPD file. Further, the processing circuit 170 can determine client and environment requirements, such as a region of interests, language, network bandwidth, user preference, and the like. In an example, the processing circuit 170 can detect a region of interests. For example, the processing circuit 170 determines the region of interests based on a position of a head-mounted device. Based on the region of interests, the processing circuit 170 can determine a spatial requirement. The processing circuit 170 can determine other requirement, such as a bitrate requirement. In an example, the processing circuit 170 can detect a network status. For example, the processing circuit 170 can monitor a buffer (not shown) configured to buffer segment streams provided by the delivery system 150 to detect the network status. In an example, based on the network status, the processing circuit 170 can determine the bitrate requirement.

Further, according to an aspect of the disclosure, the processing circuit 170 can determine one or more segment streams of video content based on the MPD file to satisfy the spatial requirement, and other suitable requirements, such as the bitrate requirement. The processing circuit 170 can then select segments in the determine segment streams, and cause the interface circuit 161 to request the selected segments from the HTTP server 140 based on the addresses of the selected segments in the MPD file.

It is noted that the processing circuit 170 can determine segment streams of other media data, such as audio, and the like, select segments from the determined segment streams of the other media data and cause the interface circuit 161 to request the selected segments from the HTTP server 140.

In an embodiment, when the requested segments of media data are received via the interface circuit 161, the processing circuit 170 can process the segments. For example, the processing circuit 170 can decode segments of the video content and generate images accordingly. The display device 165 can present the generated images to the one or more users.

In an example, the processing circuit 170 includes a MPD processing module 180 and an image generation module 190. The MPD processing module 180 is configured to process the MPD file, determine one or more segment streams of video content based on the spatial information in the MPD file, select segments in the determined segment stream, extract the addresses (e.g., URL address) of the selected segments and use the addresses to request segments from the HTTP server 140 for example. The image generation module 190 is configured to generate images of the region of interests based on the received segments. The MPD processing module 180 and the image generation module 190 can be implemented as processors executing software instructions and can be implemented as integrated circuits.

Figure 2A:
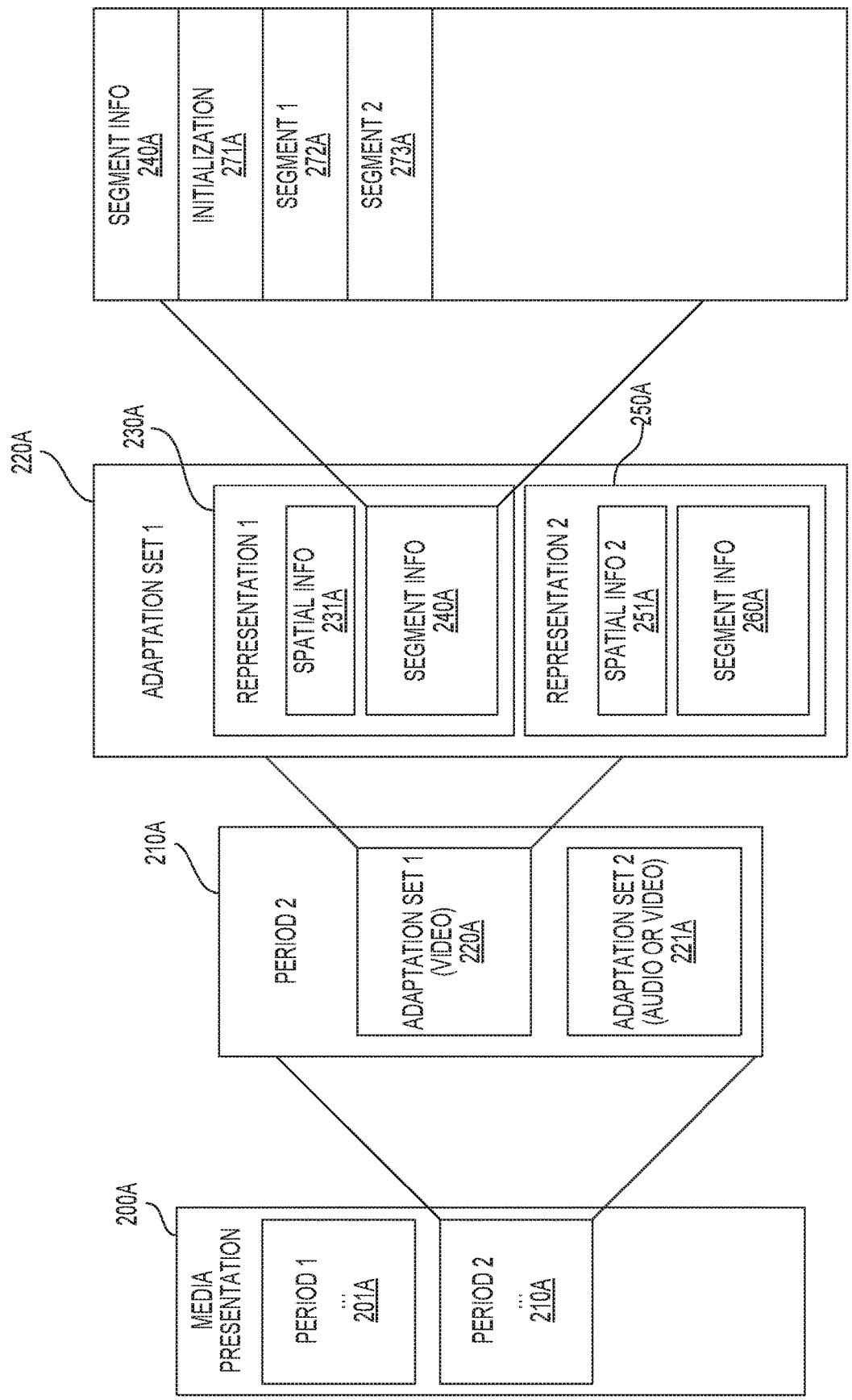
FIGS. 2A-2B show examples of media presentation description according to embodiments of the disclosure.

FIG. 2A shows an example of media presentation 200A according to an embodiment of the disclosure. In an example, the MPD generation module 130 is configured to generate a MPD file based on the media presentation 200A, the memory 141 is configured to store the MPD file, and the MPD processing module 180 is configured to process the MPD file.

In the FIG. 2A example, the media presentation 200A represents structures to arrange encoded media data of media content. In the FIG. 2A example, the media content is sliced according to time, and the media presentation 200 includes a sequence of one or more periods, such as a first period 201A (e.g., PERIOD 1) of media content, a second period 210A (e.g., PERIOD 2) of media content, and the like. Each period corresponds to a time internal. In an example, the sequence of periods is consecutive and non-overlapping. For example, the first period 201 starts at 0-second, and lasts for 100 seconds, the second period 210 starts at 100th second, and lasts 195 seconds, and the like.

Further, in the FIG. 2A example, a period of media content includes a plurality of adaptation sets that correspond to different media components. For example, the second period 210A includes a first adaptation set 220A of video component, a second adaptation set 221A of audio component, and the like. In another example, both the first adaptation set 220A and the second adaptation set 221A correspond to video components with different coverage in spatial domain. The first adaptation set 220A and the second adaptation set 221A are sections for sub-picture regions, and include geometry information respectively in the sections for the sub-picture regions. For example, the first adaptation set 220A includes one or more representations for a first sub-picture region, and the second adaptation set 221A includes one or more representations for a second sub-picture region that is different from the first sub-picture region. When the second adaptation set 221A corresponds to video component, the second adaptation set 221A is similarly configured as the first adaptation set 220A.

Further, in the FIG. 2A example, an adaptation set includes one or more representations for media component. The representations can have spatial and/or other differences (e.g., quality). For example, the first adaptation set 220A includes one or more representations of video content, such as a first representation 230A, a second representation 250A, and the like having different coverage in spatial domain and/or other difference. In an example, the first representation 230A and the second representation 250A are alternative representations of the same video content. The first representation 230A and the second representation 250A can have different coverage in spatial domain (e.g., region coverage, quality coverage). In an example, at a time in the second period 210A, one of the first representations 230A and the second representation 250A can be selected.

In the FIG. 2A example, a representation corresponds to a segment stream. In the MPD file, a representation includes specific information for the segment stream. For example, the first representation 230A includes spatial information 231A (e.g., a high resolution region) that is specific for a first segment stream. In an example, the spatial information 231A can be used by a rendering system, such as the rendering system 160 to determine whether the first segment stream satisfies the spatial requirement. The first representation 230A also includes segment information 240A for the first segment stream. Similarly, the second representation 250A includes spatial information 251A and segment information 260A.

In the FIG. 2A example, the segment information 240A includes segment initialization information 271A, a first segment information 272A for a first segment in the first segment stream, a second segment information 273A for a second segment in the first segment stream, and the like. The first segment information 272A can include timing information of the first segment, and an address, such as URL address for the first segment. In an example, the timing information indicates a sub time internal in the first period 201A. The timing information can be used, for example by the rendering system 160, to select segments in a determined segment stream. The addresses can be used by the rendering system 160 to request the selected segments.

Figure 2B:
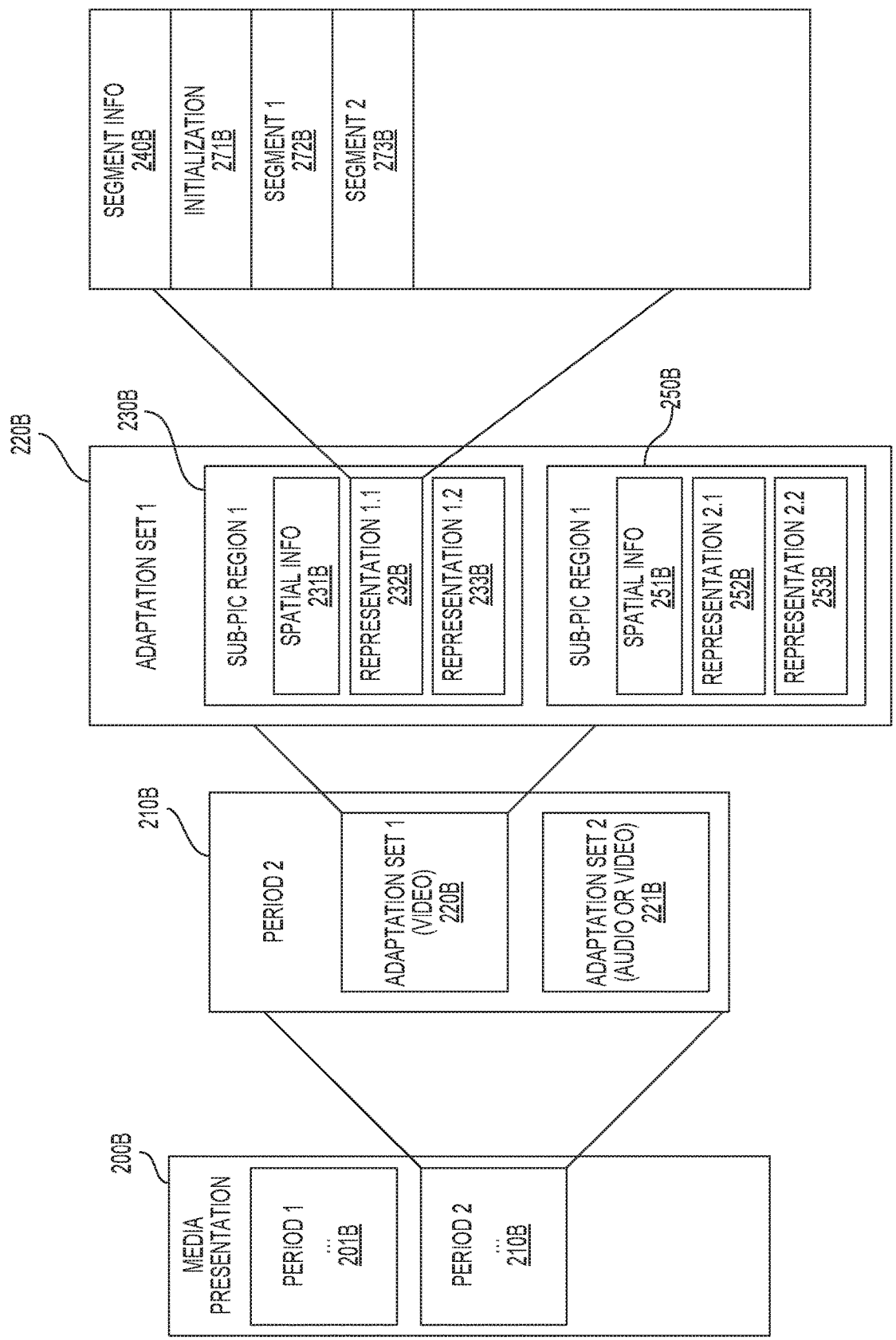

FIG. 2B shows an example of media presentation 200B according to an embodiment of the disclosure. In an example, the MPD generation module 130 is configured to generate a MPD file based on the media presentation 200B, the memory 141 is configured to store the MPD file, and the MPD processing module 180 is configured to process the MPD file.

The media presentation 200B includes similar structures as the media presentation 200A. The description of these structures has been provided above and will be omitted here for clarity purposes. However, the first adaptation set 220B in the media presentation 200B has different structures from the first adaptation set 220A in the media presentation 200A.

Specifically, the first adaptation set 220B corresponds to video content of a surface, such as a sphere surface, a 2-D plane, and the like. The surface is divided into a plurality of sub-picture regions that can be overlapping or non-overlapping. The first adaptation set 220B includes a plurality of sections for the sub-picture regions. For example, the surface is divided into a first sub-picture region and a second sub-picture region that can be overlapping or non-overlapping. The first adaptation set 220B includes a first sub-picture region 230B (SUB-PIC REGION 1) that is the section for the first sub-picture region, and a second sub-picture region 250B (SUB-PIC REGION 2) that is the section for the second sub-picture region. The first sub-picture region 230B includes spatial information 231B that specifies the spatial characteristic of the first sub-picture region. The second sub-picture region 250B includes spatial information 251B that specifies the spatial characteristic of the second sub-picture region. In an embodiment, the spatial information 231B and 251B can be used by a rendering system, such as the rendering system 160 to select one or more sub-picture regions.

In an embodiment, a sub-picture region can have one representation corresponding to a segment stream. In another embodiment, a sub-picture region can have multiple alternative representations of the same video content but different qualities for example.

Figure 3:
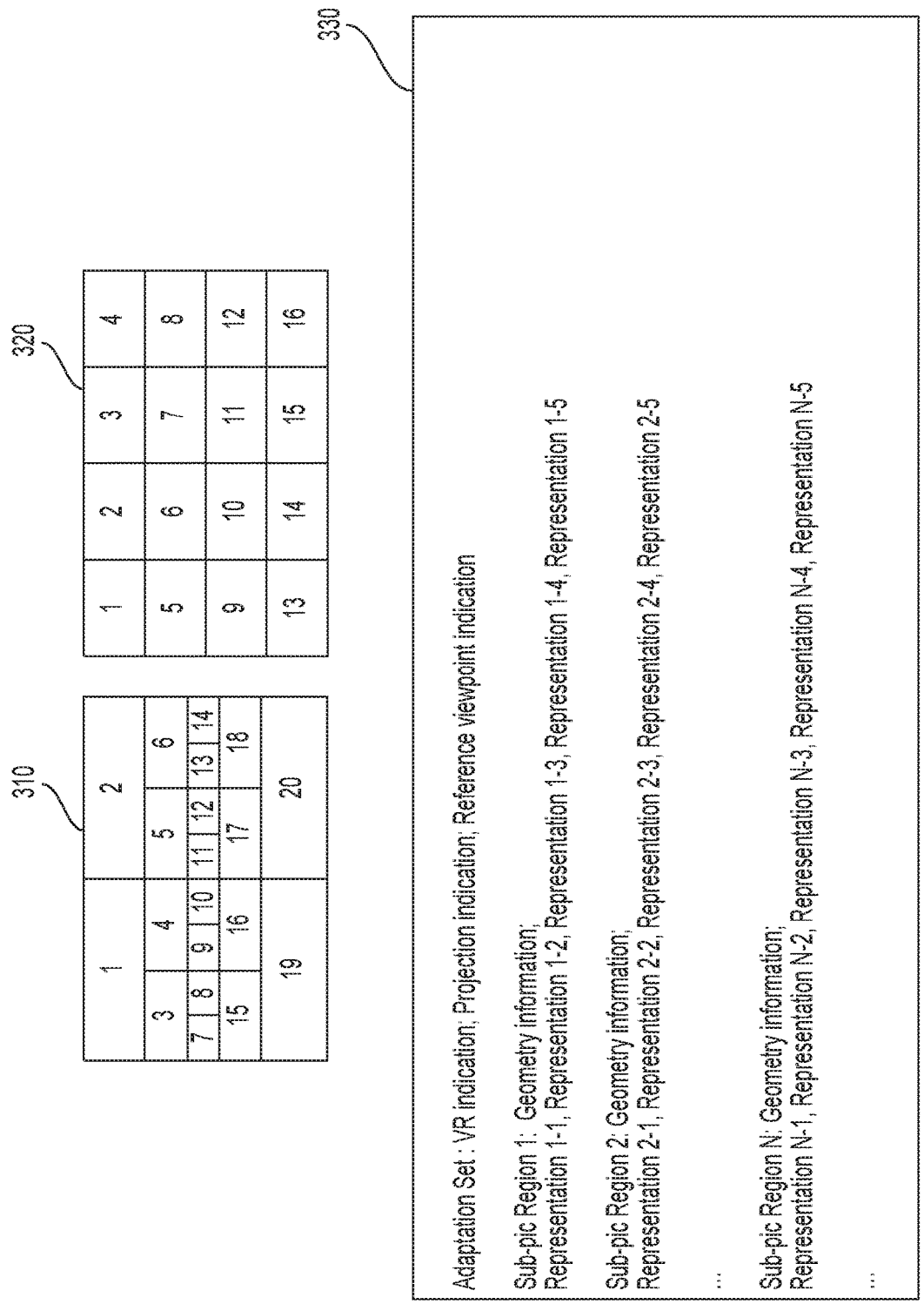
FIGS. 3-7 show examples of adaptation sets according to embodiments of the disclosure.

FIG. 3 shows an example of an adaptation set according to an embodiment of the disclosure. FIG. 3 shows a first rectangular plane 310 and a second rectangular plane 320.

In an example, the first rectangular plane 310 and the second rectangular plane 320 correspond to a sphere surface and are results of an equirectangular projection (ERP). The ERP projection projects a sphere surface to a rectangular plane in a similar manner as projecting earth surface to a map.

In another example, the first rectangular plane 310 and the second rectangular plane 320 are results of other suitable projection. In an example, an omnidirectional image in a sphere surface is projected to surfaces of platonic solid, such as tetrahedron, cube, octahedron, icosahedron, and the like. The projected surfaces can be respectively rearranged, such as rotated, relocated to form 2D image in a rectangular plane.

The first rectangular plane 310 and the second rectangular plane 320 are divided into sub-picture regions of the same sizes or different sizes. In the FIG. 3 example, the first rectangular plane 310 is divided into 20 sub-pic regions that can have different sizes. For example, the sub-pic regions 7-14 have relatively small sizes, and the sub-pic regions 1, 2, 19 and 29 have relatively large sizes. The second rectangular plane 320 is divided into 16 sub-pic regions of the same sizes.

FIG. 3 also shows a format example 330 for adaptation set of video content in a MPD file. The format 330 can be used for the first rectangular plane 310 or the second rectangular plane 320.

In the FIG. 3 example, the format 330 includes a VR indication, a projection indication and a reference viewpoint indication at the adaptation set level. In an example, the VR indication indicates that the video content is for a virtual reality application, and includes omnidirectional images; the projection indication indicates a projection method; and the reference viewpoint indication indicates a viewing reference.

Further, in the format 330, the adaptation set includes a plurality of sections corresponding to sub-picture regions in a rectangular plane. Each section for a sub-picture region includes geometry information of the corresponding sub-picture region, and includes a plurality of representations respectively corresponding to segment streams. In an example, segment streams have different bitrates.

In an example, the rendering system 160 determines spatial requirement (e.g., a region of interests) and a bitrate requirement. Based on the spatial requirement, the rendering system 160 selects a sub-picture region with the geometry information satisfying the spatial requirement. Further, based on the bitrate requirement, the rendering system 160 selects a representation under the selected sub-picture region with a bitrate that satisfies the bitrate requirement.

Figure 4:
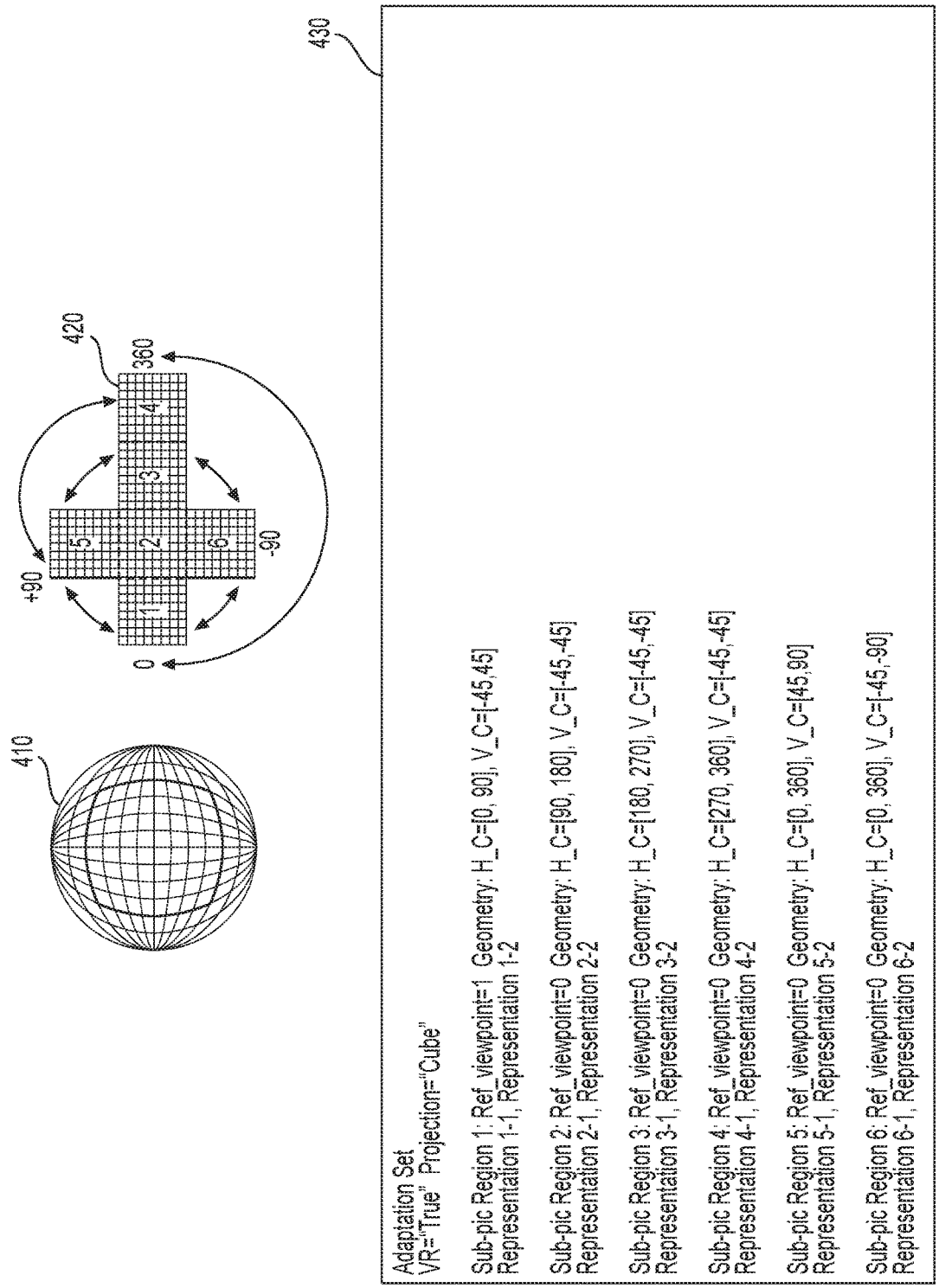

FIG. 4 shows an example of an adaptation set according to an embodiment of the disclosure. In the FIG. 4 example, a sphere surface 410 is projected to a cube of 6 projected faces, the projected faces can be arranged in a 2-D plane 420 having sub-picture regions 1-6. The sub-picture regions 1-6 correspond to the 6 projected faces.

FIG. 4 also shows an adaptation set 430 of video content in a MPD file. The adaptation set 430 can be used for the projected surfaces 1-6 of the 2-D plane 420.

In the FIG. 4 example, the adaptation set 430 includes a VR indication, and a projection indication at adaptation set level. In the example, a VR flag is set to "True", so the video content in the adaptation set 430 is for a virtual reality application, and includes omnidirectional images. Further, in the example, a projection flag is set to "Cube", so the projection method used in the video content is cube projection.

Further, the adaptation set 430 includes six sections respectively for the sub-picture regions 1-6. Each section includes geometry information of the corresponding sub-picture region and a reference viewpoint flag, and includes a plurality of representations respectively corresponding to segment streams. In an example, segment streams have different bitrates. The reference viewpoint flag is used to indicate a reference surface. For example, the sub-picture region 1 is the viewing reference.

In an example, the rendering system 160 determines spatial requirement (e.g., a region of interests) and a bitrate requirement. Based on the spatial requirement, the rendering system 160 selects a sub-picture region with the geometry information that satisfies the spatial requirement. Further, based on the bitrate requirement, the rendering system 160 selects a representation under the selected sub-picture region, the selected representation has a bitrate that satisfies the bitrate requirement.

Figure 5:
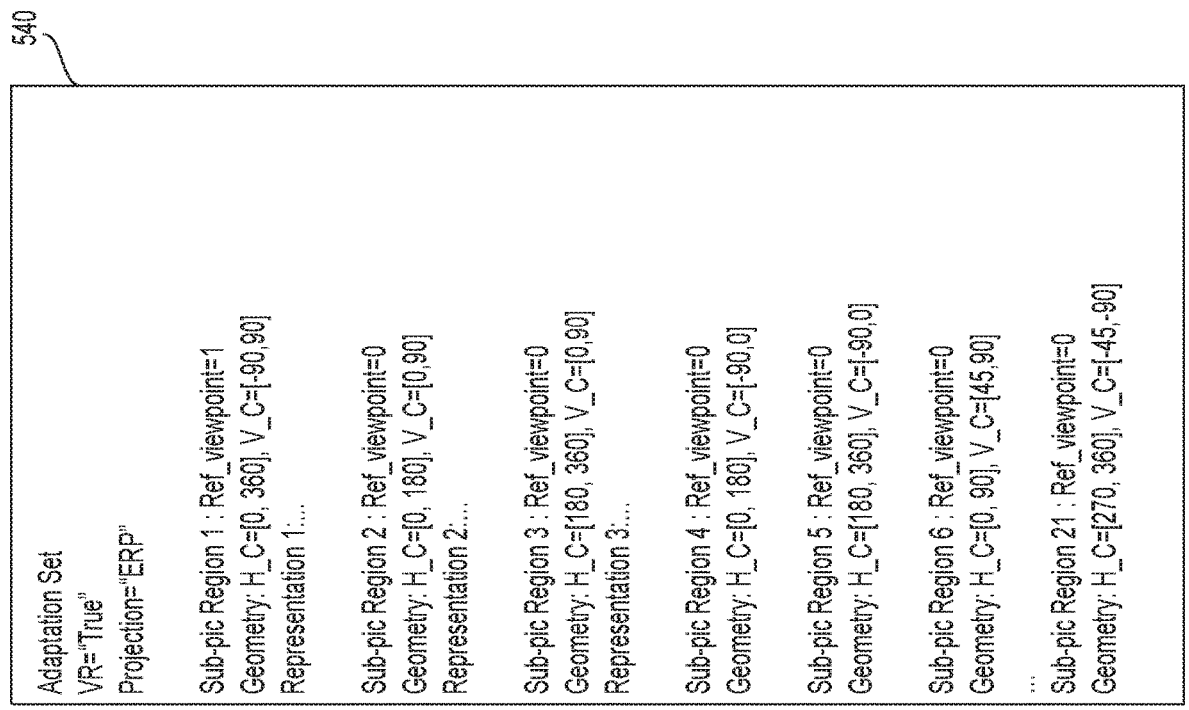
Figure 5:
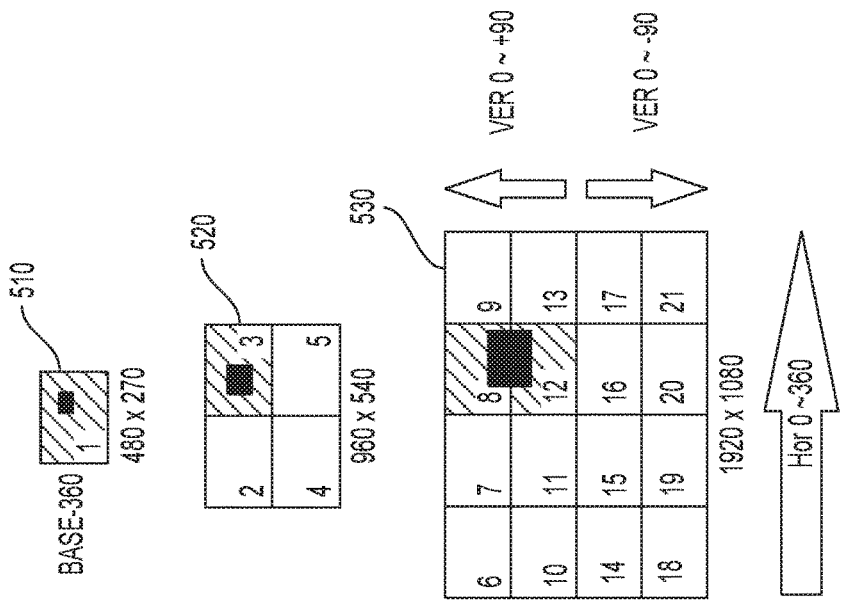

FIG. 5 shows an example of an adaptation set according to an embodiment of the disclosure. In an example, a sphere surface is projected to rectangular planes of different resolutions according to equirectangular projection (ERP). In the FIG. 5, a first rectangular plane 510, a second rectangular plane 520 and a third rectangular plane 530 are generated of different resolutions. The rectangular planes of different resolutions are divided into sub-picture regions. In the FIG. 5 example, the three rectangular planes 510-530 are divided into 21 sub-picture regions altogether. The sub-picture region 1 has a first resolution (e.g., lowest resolution of the three resolutions), the sub-picture regions 2-5 have a second resolution (e.g., medium resolution of the three resolutions), and the sub-picture regions 6-21 have the third resolution (e.g., highest resolution of the three resolutions).

FIG. 5 also shows an adaptation set 540 of video content in a MPD file. The adaptation set 540 can be used for the rectangular planes 510-530.

In the FIG. 5 example, the adaptation set 540 includes a VR indication, and a projection indication at adaptation set level. In the example, a VR flag is set to "True", so the video content in the adaptation set 540 is for a virtual reality application, and includes omnidirectional images. Further, in the example, a projection flag is set to "ERP", so the projection method used in the video content is ERP.

Further, the adaptation set 540 includes 21 sections for 21 sub-picture regions. Each section includes geometry information of the corresponding sub-picture region and a reference viewpoint flag. The reference viewpoint flag is used to indicate a viewing reference.

In the FIG. 5 example, each section includes one representation corresponding to a segment stream. The sub-picture regions can have different resolutions and the segment streams can have different bitrates. For example, the sub-picture region 1 has the first resolution and the corresponding segment stream has a first bitrate (e.g., low bit rate); the sub-picture regions 2-5 have the second resolution and the corresponding segment streams have a second bitrate (e.g., medium bit rate); and the sub-picture regions 6-21 have the third resolution and the corresponding segment streams have a third bitrate (e.g., high bit rate). The bitrates can be determined based on the geometry information in an example. For example, the geometry information of the sub-picture region 1 indicates that the sub-picture region 1 covers the whole sphere surface, thus sub-pic region 1 has low resolution and corresponding segment stream has the first bitrate. The geometry information of the sub-picture region 2 indicates that the sub-picture region 2 covers/of the sphere surface, thus sub-picture region 2 has medium resolution and corresponding segment stream has the second bitrate. The geometry information of the sub-picture region 6 indicates that the sub-picture region 6 covers 1/16 of the sphere surface, thus sub-picture region 6 has high resolution and the corresponding segment stream has the third bitrate. It is noted that, in an example, the bitrates can be explicitly indicated in the sections.

In an example, the rendering system 160 determines spatial requirement (e.g., a region of interests) and a bitrate requirement. Based on the spatial requirement and the bitrate requirement, the rendering system 160 selects one or more sub-picture regions with the geometry information satisfying the spatial requirement and with the bitrate satisfying the bitrate requirement.

Figure 6:
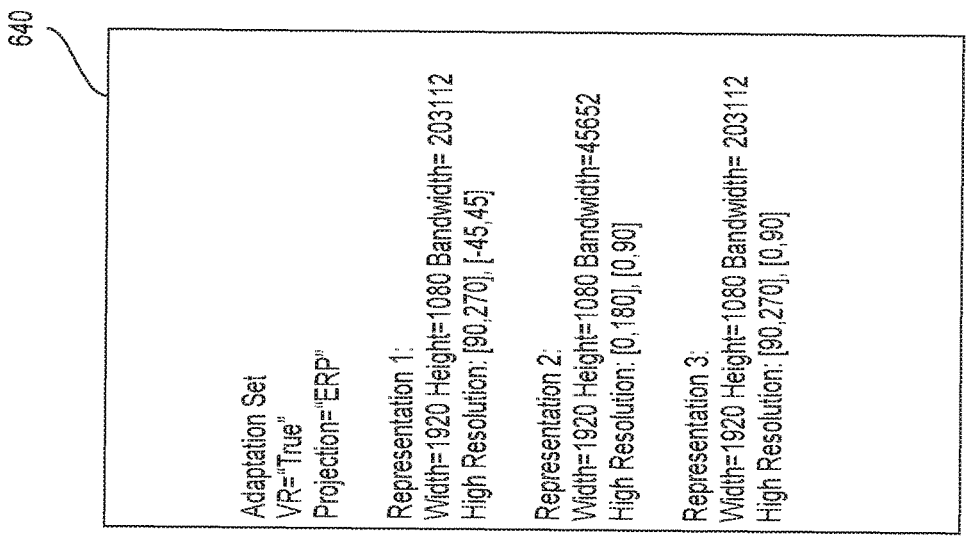
Figure 6:
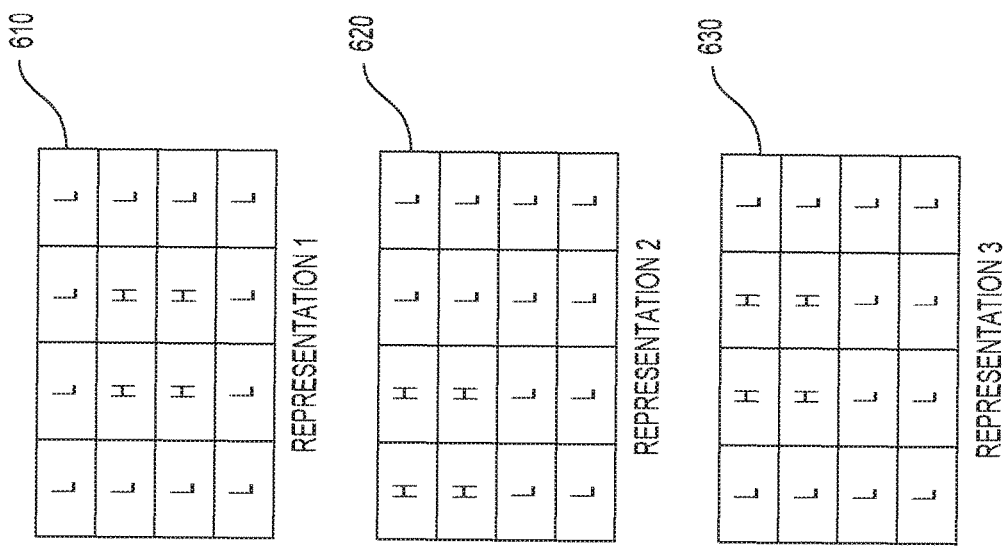

FIG. 6 shows an example of an adaptation set according to an embodiment of the disclosure. In the FIG. 6 example, a sphere surface is projected to a rectangular plane according to equirectangular projection (ERP). Further, multiple segment streams of video content for the rectangular plane are generated, and the multiple segment streams have different high resolution sub-regions.

FIG. 6 shows a first representation 610 corresponding to a first segment stream for the rectangular plane, a second representation 620 corresponding to a second segment stream for the rectangular plane, and a third representation 630 corresponding to a third segment stream for the rectangular plane. The rectangular plane is divided into for example 16 sub-picture regions. When a sub-picture region is labeled with "H", the sub-picture region is encoded to have a relatively high resolution, and when a sub-picture region is labeled with "L", the sub-picture region is encoded to have a relatively low resolution. The high resolution sub-picture regions in first representation 610, the second representation 620 and the third representation 630 can overlap, but are not the same in an example.

FIG. 6 also shows an adaptation set 640 of video content for the representations 610-630 in a MPD file. The adaptation set 640 includes a VR indication, and a projection indication at adaptation set level. In the example, a VR flag is set to "True", so the video content in the adaptation set 640 is for a virtual reality application, and includes omnidirectional images. Further, in the example, a projection flag is set to "ERP", so the projection method used in the video content is ERP.

Further, the adaptation set 640 includes 3 representations. Each representation includes dimension information, bandwidth information and geometry information for high resolution sub-picture regions. It is noted that, in an example, the bandwidth information and bitrate information are correlated. The bitrate information can be determined based on the bandwidth information.

In an example, the rendering system 160 determines spatial requirement (e.g., a region of interests) and a bitrate requirement. Based on the spatial requirement and the bitrate requirement, the rendering system 160 selects one of the representations with the geometry information satisfying the spatial requirement and with the bitrate satisfying the bitrate requirement.

According to an aspect of the disclosure, the adaptation set 640 can be used to enable a relatively smooth image generation in response to a change of the region of interests. In an example, at a first time, the region of interests is in the middle of rectangular plane, the rendering system 160 selects segments in a first segment stream corresponding to the first representation 610, and can generate high resolution images for the region of interests. At a second time, the region of interests switches to the upper left sub-picture region, the rendering system 160 can select segments in a second segment stream corresponding to the second representation 620. However, it takes time for the rendering system 160 to receive the segments in the second segment stream. Before the rendering system 160 can generate high resolution images for the new region of interests based on the segments of the second segment stream, the rendering system 160 can generate relatively low resolution images for the new region of interests based on the previously received segments in the first segment stream.

Figure 7:
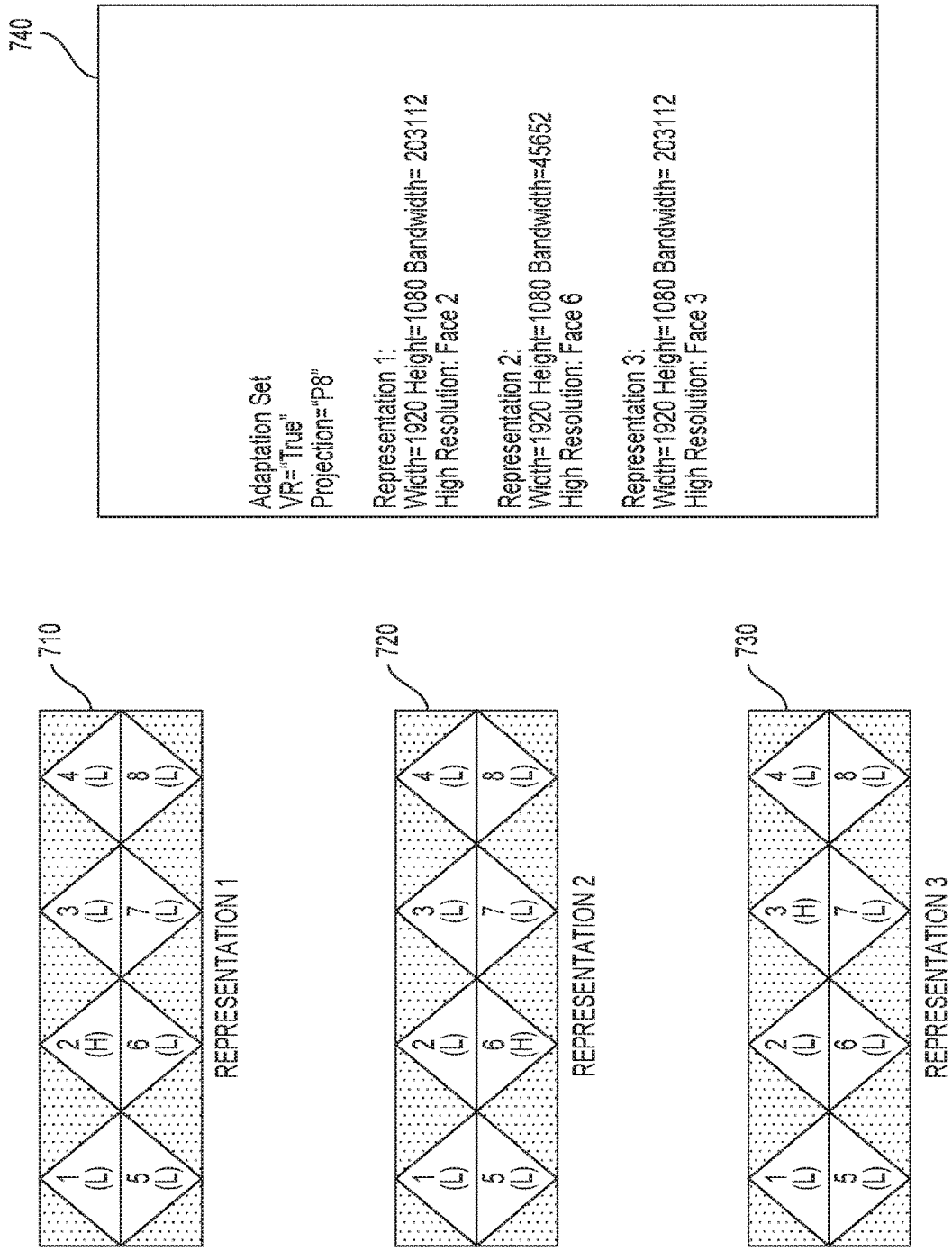

FIG. 7 shows an example of an adaptation set according to an embodiment of the disclosure. In the FIG. 7 example, a sphere surface is projected to faces of an octahedron solid. The eight faces are arranged to form a 2-D plane. Further, multiple segment streams of video content for the 2-D plane are generated, and the multiple segment streams have different high resolution faces.

FIG. 7 shows a first representation 710 corresponding to a first segment stream for the 2-D plane, a second representation 720 corresponding to a second segment stream for the 2-D plane, and a third representation 730 corresponding to a third segment stream for the 2-D plane. The 2-D plane includes 8 faces that are labeled 1-8 as shown in FIG. 7. Further, when a face is labeled with "H", the face is encoded to have a relatively high resolution, and when a face is labeled with "L", the face is encoded to have a relatively low resolution. The high resolution faces in first representation 710, the second representation 720 and the third representation 730 can overlap, but are not the same in an example.

FIG. 7 also shows an adaptation set 740 of video content for the representations 710-730 in a MPD file. The adaptation set 740 includes a VR indication, and a projection indication at adaptation set level. In the example, a VR flag is set to "True", so the video content in the adaptation set 640 is for a virtual reality application, and includes omnidirectional images. Further, in the example, a projection flag is set to "P8", so the sphere surface is projected to faces of an octahedron solid.

Further, the adaptation set 740 includes 3 representations. Each representation includes dimension information, bandwidth information and geometry information for high resolution faces. It is noted that, in an example, the bandwidth information and bitrate information are correlated. The bitrate information can be determined based on the bandwidth information.

In an example, the rendering system 160 determines spatial requirement (e.g., a region of interests) and a bitrate requirement. Based on the spatial requirement and the bitrate requirement, the rendering system 160 selects one of the representations with the geometry information satisfying the spatial requirement and with the bitrate satisfying the bitrate requirement.

According to an aspect of the disclosure, the adaptation set 740 can be used to enable a relatively smooth image generation in response to a change of the region of interests.

In an example, at a first time, the region of interests is in the face 2, the rendering system 160 selects segments in a first segment stream corresponding to the first representation 710, and can generate high resolution images for the region of interests. At a second time, the region of interests switches to the face 6, the rendering system 160 can select segments in a second segment stream corresponding to the second representation 720. However, it takes time for the rendering system 160 to receive the segments in the second segment stream. Before the rendering system 160 can generate high resolution images for the new region of interests based on the segments of the second segment stream, the rendering system 160 can generate relatively low resolution images for the new region of interests based on the previously received segments in the first segment stream.

Figure 8:
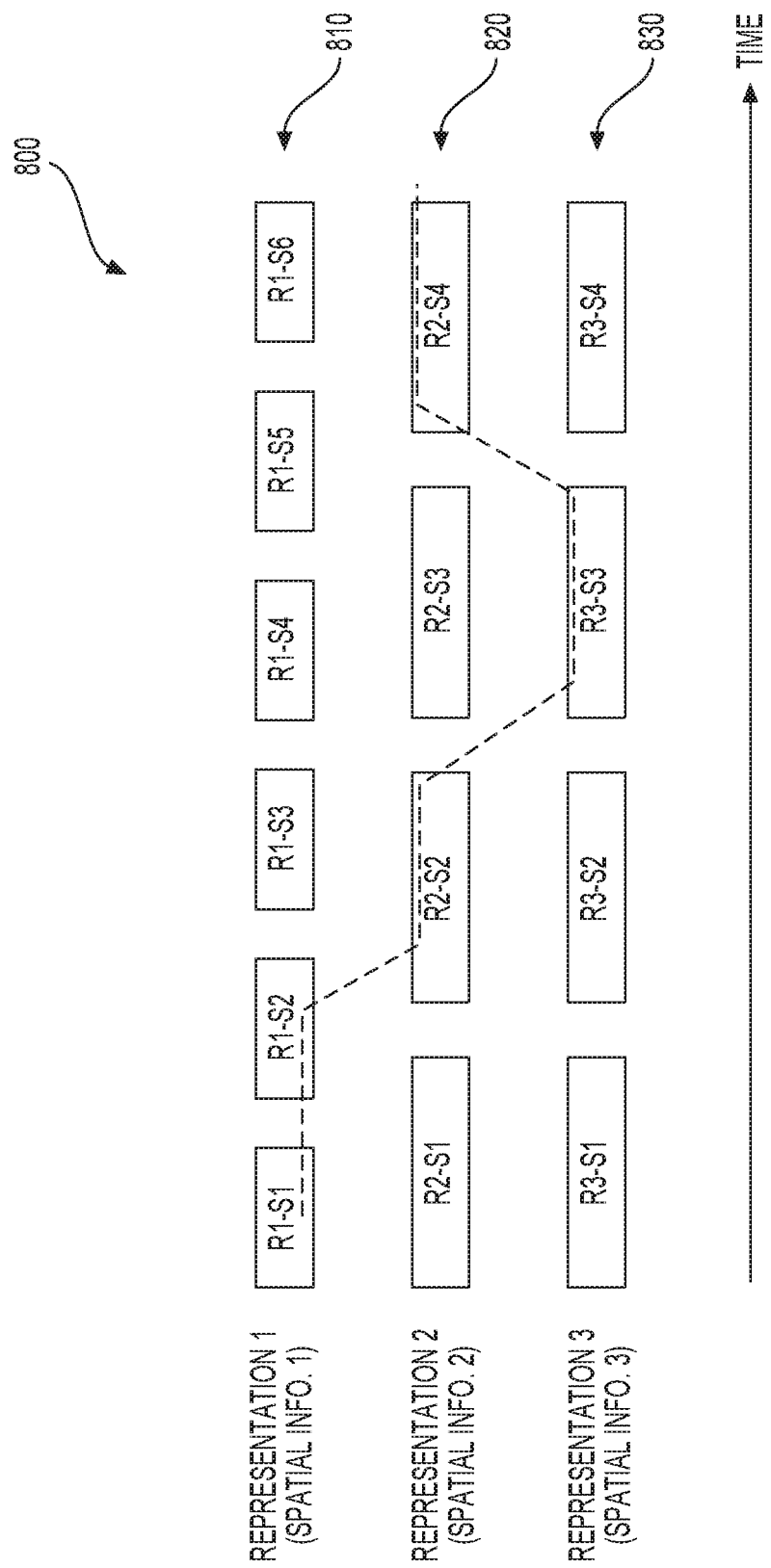
FIG. 8 shows a diagram illustrating a dynamic adaptive streaming example according to an embodiment of the disclosure.

FIG. 8 shows a diagram 800 illustrating a dynamic adaptive streaming example according to an embodiment of the disclosure. In an example, the rendering system 160 requests and receives a stream of video content according to the diagram 800.

The diagram 800 shows a first representation for a first segment stream 810, a second representation for a second segment stream 820 and a third representation for a third segment stream 830 of the video content with different coverage in spatial domain. In an example, the first segment stream 810 has a first resolution that is a relatively low resolution, and the first segment stream 810 covers a first region that is a relatively large region (e.g., the whole plane). The second segment stream 820 has a second resolution, and the second segment stream 820 covers a second region. The third segment stream 830 has the second resolution, and the third segment stream 830 covers a third region. In an example, the second resolution is higher than the first resolution. In an example, the adaptation set 540 in the FIG. 5 example is used to include the description information for the first segment stream 810, the second segment stream 820 and the third segment stream 830. For example, the first representation is for the sub-picture region 1, the second representation is for the sub-picture region 2, and the third representation is for the sub-picture region 3 in the FIG. 5 example.

In the FIG. 8 example, the first segment stream 810 includes a first plurality of segments R1-S1 to R1-S6, the second segment stream 820 includes a second plurality of segments R2-S1 to R2-S4, and the third segment stream 830 includes a third plurality of segments R3-S1 to R3-S4.

During operation, in an example, the rendering system 160 receives a MPD file that includes, for example the adaptation set 540 of the first, second and third representations. In the example, initially, the rendering system 160 requests and receives segments in the first segment stream 810, such as R1-S1, R1-S2. The segments in the first segment stream 810 have low bitrate and occupy a relatively low bandwidth. Images generated based on the segments in the first segment stream 810 have a relatively low resolution.

Then, the rendering system 160 detects that higher bandwidth is available. The rendering system 160 detects that the region of interests is in the second sub-picture region. Thus, the rendering system 160 requests and receives segments in the second segment stream 820, such as R2-S2, and generates images based on for example the segment R2-S2. Further, the rendering system 160 detects a change of region of interests from the second sub-picture region to the third sub-picture region, thus the rendering system 160 requests and receives segments of the third segment stream 830, such as R3-S3, and generates images based on for example the segment R3-S3.

Figure 9:
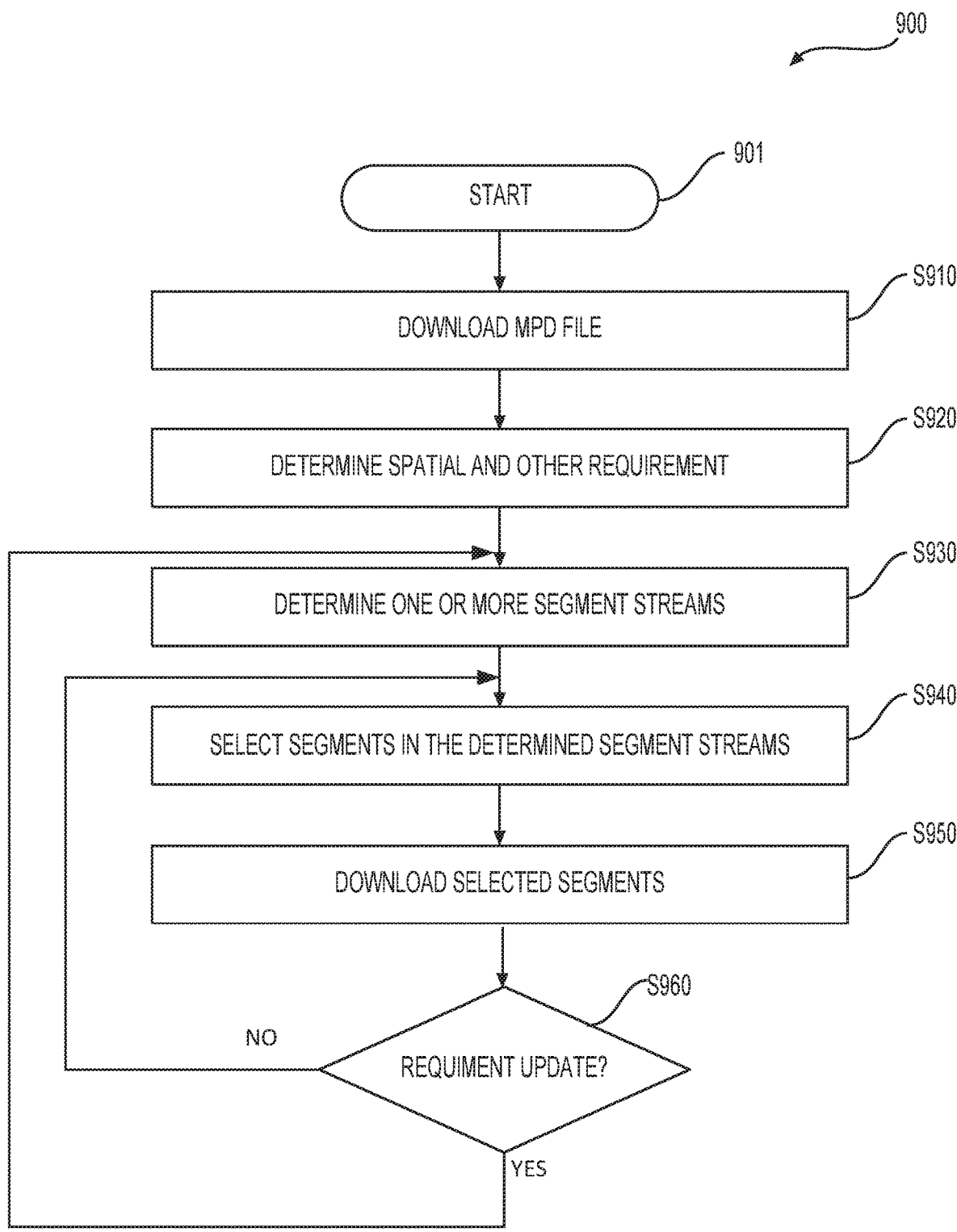
FIG. 9 shows a flow chart outlining a process example 900 according to an embodiment of the disclosure.

FIG. 9 shows a flow chart outlining a process example 900 according to an embodiment of the disclosure. In an example, the process 900 is executed by the rendering system 160 according to an embodiment of the disclosure. The process starts at S901 and proceeds to S910.

At S910, a MPD file is downloaded. In an example, the rendering system 160 downloads the MPD file 142 from the HTTP server 140.

At S920, spatial requirement (e.g., region of interests) and other requirement, such as bitrate requirement, are determined. In an example, the rendering system 160 determines an initial bitrate and an initial region of interest.

At S930, one or more segment streams are determined to satisfy the spatial requirement and the other requirement. In an example, the rendering system 160 selects one or more sub-picture regions with geometry information satisfying the spatial requirement. Then the rendering system 160 selects one of the representations for a selected sub-picture region that satisfies the bitrate requirement. The selected representation corresponds to a segment stream, and includes segment information (e.g., timing information, URL address information) of segments in the segment stream.

At S940, segments are selected from the determined segment streams. In an example, the rendering system 160 selects the segments based on time.

At S950, the selected segments are downloaded. In an example, the rendering system 160 downloads the selected segments from the HTTP server 140 based on the URL addresses of the selected segments. Then, images are generated based on the downloaded segments.

At S960, when one or more requirements are updated, the process returns to the S930 to determine segment streams based on the updated requirements; otherwise, the process returns to S940 to select segments from the determined segment streams. In an example, the rendering system 160 detects a change in network traffic status, and updates a bitrate requirement, thus the process returns to S930. In another example, the rendering system 160 detects a change in the region of interests, and updates a spatial requirement, thus the process returns to S930. In another example, the rendering system 160 updates a time period, and the process returns to S930.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
    an interface circuit configured to receive a media description information file corresponding to a plurality of segment streams for a same planar surface, the media description information file including address information of the plurality of segment streams, projection information that indicates a projection relationship between sections of a sphere surface and respective sub-regions in the planar surface, and geometry information that, for each of the plurality of segment streams, identifies a high-resolution region having a relative high resolution with respect to a remaining region in the corresponding segment stream and associates the identified high-resolution region with a corresponding section of the sphere surface, wherein
  the media description information file includes an adaptation set that includes the projection information and the geometry information, and
  the adaptation set further includes a flag that is set to indicate that the plurality of segment streams is for a virtual reality application;
a processing circuit configured to
  determine one of the plurality of segment streams as a selected segment stream based on a region of interests for image generation, the projection information, and the geometry information, and
  cause the interface circuit to request and receive the selected segment stream based on the address information; and
a display device configured to display images generated based on the selected segment stream.

2. The apparatus of claim 1, wherein
the plurality of segment streams corresponds to different bitrates, and
the processing circuit is configured to determine the selected segment stream that satisfies a bitrate requirement.

3. The apparatus of claim 1, wherein
the projection information included in the media description information file indicates that the sub-regions in the planar surface correspond to projected faces of a platonic solid.

4. The apparatus of claim 1, wherein the geometry information included in the media description information file identifies the sub-regions using a sphere coordinate system.

5. The apparatus of claim 1, wherein the processing circuit is configured to
  detect a change in the region of interests, and
  determine whether to update the selected segment stream in response to the change.

6. A method for image rendering, comprising:
receiving a media description information file corresponding to a plurality of segment streams for a same planar surface, the media description information file including address information of the plurality of segment streams, projection information that indicates a projection relationship between sections of a sphere surface and respective sub-regions in the planar surface, and geometry information that, for each of the plurality of segment streams, identifies a high-resolution region having a relative high resolution with respect to a remaining region in the corresponding segment stream and associates the identified high-resolution region with a corresponding section of the sphere surface, wherein
  the media description information file includes an adaptation set that includes the projection information and the geometry information, and
  the adaptation set further includes a flag that is set to indicate that the plurality of segment streams is for a virtual reality application;
determining, by a processing circuit, one of the plurality of segment streams as a selected segment stream based on a region of interests for image generation, the projection information, and the geometry information;
transmitting a request for the selected segment stream based on the address information;
receiving the selected segment stream; and
displaying images generated based on the selected segment stream.

7. The method of claim 6, wherein
the plurality of segment streams corresponds to different bitrates, and
the method comprises determining the selected segment stream that satisfies a bitrate requirement.

8. The method of claim 6, wherein
the projection information included in the media description information file indicates that the sub-regions in the planar surface correspond to respective projected faces of a platonic solid.

9. The method of claim 6, wherein the geometry information included in the media description information file identifies the sub-regions using a sphere coordinate system.

10. The method of claim 6, further comprising:
  detecting a change in at least one of the region of interests; and
  determining whether to update the selected segment stream in response to the change.

11. The method of claim 6, wherein the address information of the plurality of segment streams included in the media description information file includes Uniform Resource Locator (URL) addresses.

12. The apparatus of claim 1, wherein the address information of the plurality of segment streams included in the media description information file includes Uniform Resource Locator (URL) addresses.

* * * * *